(12) United States Patent
Purkayastha et al.

(10) Patent No.: US 10,561,164 B2
(45) Date of Patent: Feb. 18, 2020

(54) STEVIA COMPOSITION TO IMPROVE SWEETNESS AND FLAVOR PROFILE

(71) Applicant: PureCircle Sdn Bhd, Kuala Lumpur (MY)

(72) Inventors: Siddhartha Purkayastha, Chicago, IL (US); Avetik Markosyan, Yerevan (AM); John Martin, Chicago, IL (US); Marcia Petit, Chicago, IL (US)

(73) Assignee: PureCircle Sdn Bhd, Kuala Lumper (MY)

( * ) Notice: Subject to any disclaimer, the term of this patent is extended or adjusted under 35 U.S.C. 154(b) by 246 days.

(21) Appl. No.: 15/369,400

(22) Filed: Dec. 5, 2016

(65) Prior Publication Data

US 2017/0231259 A1 Aug. 17, 2017

Related U.S. Application Data

(60) Division of application No. 13/957,098, filed on Aug. 1, 2013, now Pat. No. 9,510,611, which is a continuation-in-part of application No. PCT/US2012/051163, filed on Aug. 16, 2012, which is a continuation-in-part of application No. PCT/US2012/024585, filed on Feb. 10, 2012, and a continuation-in-part of application No. PCT/US2012/043294, filed on Jun. 20, 2012, said application No. 13/957,098 is a continuation-in-part of application No. 13/993,415, filed as application No. PCT/US2011/064343 on Dec. 12, 2011, now Pat. No. 9,029,426.

(60) Provisional application No. 61/531,802, filed on Sep. 7, 2011, provisional application No. 61/441,443, filed on Feb. 10, 2011, provisional application No. 61/499,171, filed on Jun. 20, 2011, provisional application No. 61/531,802, filed on Sep. 7, 2011, provisional application No. 61/422,403, filed on Dec. 13, 2010, provisional application No. 61/424,798, filed on Dec. 20, 2010.

(51) Int. Cl.
*A23L 27/30* (2016.01)
*A23L 2/60* (2006.01)
*A23F 3/40* (2006.01)
*A23C 9/156* (2006.01)
*A23C 9/13* (2006.01)

(52) U.S. Cl.
CPC ............ *A23L 27/36* (2016.08); *A23C 9/1307* (2013.01); *A23C 9/156* (2013.01); *A23F 3/405* (2013.01); *A23L 2/60* (2013.01); *A23V 2002/00* (2013.01)

(58) Field of Classification Search
CPC ...................................................... A23L 27/36
See application file for complete search history.

(56) References Cited

U.S. PATENT DOCUMENTS

| | | |
|---|---|---|
| 2008/0292775 A1 | 11/2008 | Prakash |
| 2010/0316782 A1 | 12/2010 | Shi |
| 2011/0104353 A1 | 5/2011 | Lee |
| 2011/0189360 A1 | 8/2011 | Yoo |

*Primary Examiner* — Elizabeth Gwartney
(74) *Attorney, Agent, or Firm* — Taft Stettinius & Hollister LLP; Audrey J. Babcock

(57) ABSTRACT

Stevia compositions are prepared from steviol glycosides of *Stevia Rebaudiana* Bertoni. The compositions are able to provide a superior taste profile and can be used as sweetness enhancers, flavor enhancers and sweeteners in foods, beverages, cosmetics and pharmaceuticals.

8 Claims, 6 Drawing Sheets

Rebaudioside A

Rebaudioside B

| Sugar Equivalent Sweetness | 2.5% | 5.0% | 7.5% | 10.0% |
|---|---|---|---|---|
| | Sweetness Potency (X Sugar Equivalent) | | | |
| Reb A | 357 | 309 | 250 | 179 |
| Reb B | 146 | 126 | 95 | 59 |
| Reb D | 521 | 333 | 263 | 190 |
| Delta | 403 | 235 | 150 | 107 |

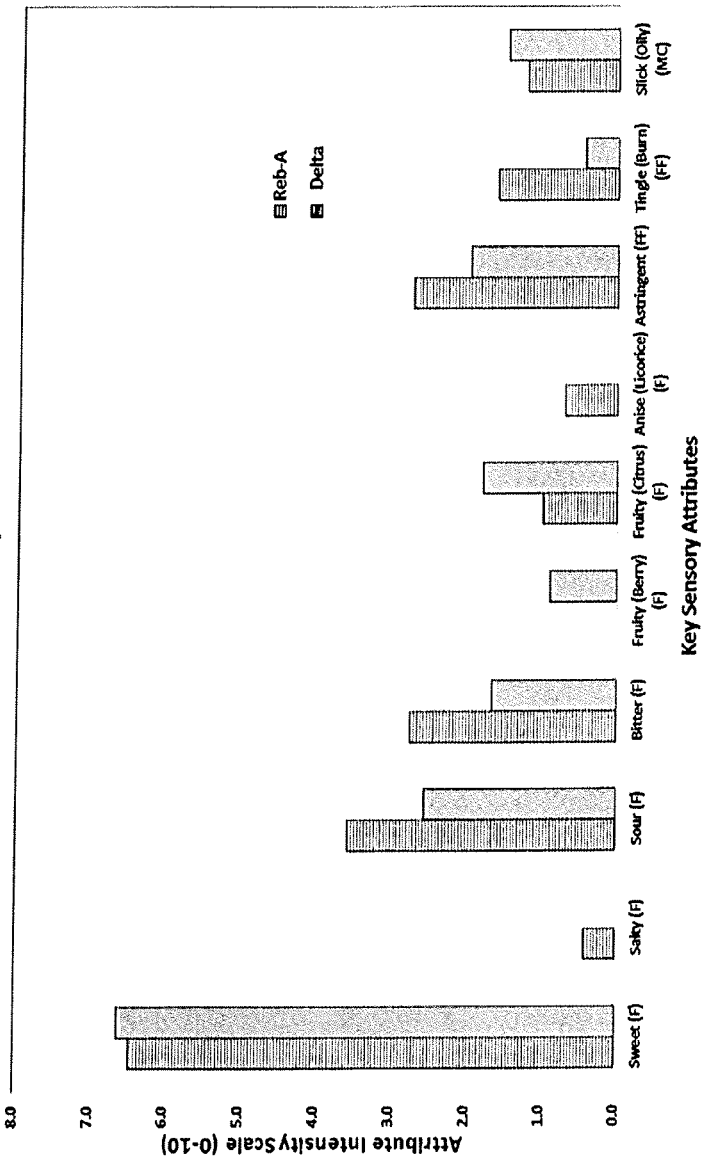

STEVIA COMPOSITION TO IMPROVE SWEETNESS AND FLAVOR PROFILE

RELATED APPLICATIONS

The present application is a divisional application of U.S. patent application Ser. No. 13/957,098, filed on Aug. 1, 2013, which is a continuation-in-part application of and claims the benefit of priority to the following applications:

PCT Application No. PCT/US2012/051163, filed on 16 Aug. 2012, which claims priority to: PCT Application No. PCT/US2012/024585, filed on 10 Feb. 2012, claiming priority to U.S. Provisional Application No. 61/441,443 filed on Feb. 10, 2011; PCT Application No. PCT/2012/043294 filed on Jun. 20, 2012, claiming priority to U.S. Provisional Application No. 61/499,171 filed on Jun. 20, 2011, and U.S. Provisional Application No. 61/531,802 filed on Sep. 7, 2011; and U.S. Provisional Application No. 61/531,802 filed on Sep. 7, 2011; and U.S. patent application Ser. No. 13/993,415 filed on Jun. 12, 2013, which is a US National Phase Application under 35 U.S.C. § 371 of PCT/US2011/064343, filed on 12 Dec. 2011, which claims priority to U.S. Provisional Application No. 61/422,403 filed on Dec. 13, 2010 and U.S. Provisional Application No. 61/424,798 filed on Dec. 20, 2010.

BACKGROUND OF THE INVENTION

Field of the Invention

The present invention relates generally to sweetener compositions comprising mainly highly purified steviol glycosides and methods for making and using them as a sweetener and flavor modifier in various food and beverage products. The invention also relates to a combination of selective Steviol Glycosides from *Stevia rebaudiana* Bertoni plant extract to make the sweetness profile more rounded and sugar-like, and more particularly, this invention describes the mixture of three major steviol glycosides, namely Rebaudioside D, Rebaudioside B and Rebaudioside A of different ratio to provide rounded sweetness profile in reduced or no sugar added food and beverage products.

Description of the Related Art

Nowadays sugar alternatives are receiving increasing attention due to awareness of many diseases in conjunction with consumption of high-calorie foods and beverages. Food and beverage industry is being challenged to produce healthier, reduced calorie foods to meet the demands of consumers and public policy officials. The food industry is faced with the challenge of making more natural, 'better for you' foods and beverages that fit consumer trends, while achieving great taste necessary for successful products. Low-calorie sweetening ingredients have expanded options for consumers looking to reduce calories and sugar levels in their diets, but these ingredients can be limited by taste, stability and versatility. The consumer perception of artificial nature and safety concerns of such sweeteners is not helping the cause either.

Therefore non-caloric sweeteners of natural origin are becoming increasingly popular. The stevia leaf extract from *Stevia rebaudiana* Bertoni, a centuries-old sweet herb, provides a unique zero calorie option that overcomes some of the barriers seen with other low-calorie sweeteners. Stevia plant produces a number of diterpene glycosides, commonly known steviol glycosides, which feature high intensity sweetness and sensory properties superior to those of many other high potency sweeteners.

The above-mentioned sweet glycosides, have a common aglycon, steviol, and differ by the number and type of carbohydrate residues at the C13 and C19 positions. The leaves of Stevia are able to accumulate up to 10-20% (on dry weight basis) steviol glycosides. The major glycosides found in Stevia leaves are Rebaudioside A (2-10%), stevioside (2-10%), and Rebaudioside C (1-2%). Other glycosides such as Rebaudioside B, D, E, and F, steviolbioside and rubusoside are found at much lower levels (approx. 0-0.2%).

Steviol glycosides differ from each other not only by molecular structure, but also by their taste properties. Usually stevioside is found to be 110-270 times sweeter than sucrose, Rebaudioside A between 150 and 320 times, and Rebaudioside C between 40-60 times sweeter than sucrose. Dulcoside A is 30 times sweeter than sucrose. Rebaudioside A has the least astringent, the least bitter, and the least persistent aftertaste thus possessing the most favorable sensory attributes in major steviol glycosides (Tanaka O. (1987) Improvement of taste of natural sweeteners. *Pure Appl. Chem.* 69:675-683; Phillips K. C. (1989) Stevia: steps in developing a new sweetener. In: Grenby T. H. ed. Developments in sweeteners, vol. 3. Elsevier Applied Science, London. 1-43). The chemical structure of Rebaudioside A is shown in FIG. 1.

Methods for the extraction and purification of sweet glycosides from the *Stevia rebaudiana* plant using water or organic solvents are described in, for example, U.S. Pat. Nos. 4,361,697; 4,082,858; 4,892,938; 5,972,120; 5,962,678; 7,838,044 and 7,862,845.

However, even in a highly purified state, steviol glycosides still possess undesirable taste attributes such as bitterness, sweet aftertaste, licorice flavor, etc. It was shown that these flavor notes become more prominent as the concentration of steviol glycosides increases (Prakash I., DuBois G. E., Clos J. F., Wilkens K. L., Fosdick L. E. (2008) Development of Rebiana, a natural, non-caloric sweetener. Food Chem. Toxicol., 46, S75-S82).

Rebaudioside B (CAS No: 58543-17-2), or Reb B, also known as stevioside $A_4$ (Kennelly E. J. (2002) Constituents of *Stevia rebaudiana* In Stevia: The genus *Stevia*, Kinghorn A. D. (Ed), Taylor & Francis, London, p. 71), is one of the sweet glycosides found in *Stevia rebaudiana*. Sensory evaluations show that Reb B was approximately 300-350 times sweeter than sucrose, while for Reb A this value was approximately 350-450 (Crammer, B. and Ikan, R. (1986) Sweet glycosides from the Stevia plant. Chemistry in Britain 22, 915-916, and 918). The chemical structures of Rebaudioside A and Rebaudioside B are shown in FIG. 1.

It was believed that Reb B forms from partial hydrolysis of Rebaudioside A during the extraction process (Kobayashi, M., Horikawa, S., Degrandi, I. H., Ueno, J. and Mitsuhashi, H. (1977) Dulcosides A and B, new diterpene glycosides from *Stevia rebaudiana*. Phytochemistry 16, 1405-1408). However further research shows that Reb B occurs naturally in the leaves of *Stevia rebaudiana* and currently it is one of nine steviol glycosides recognized by FAO/JECFA (United Nations' Food and Agriculture Organization/Joint Expert Committee on Food Additives) in calculating total steviol glycosides' content in commercial steviol glycosides preparations (FAO JECFA (2010) Steviol Glycosides, Compendium of Food Additive Specifications, FAO JECFA Monographs 10, 17-21). On the other hand, the water solubility of Reb B is reported to be about 0.1% (Kinghorn A. D. (2002) Constituents of *Stevia rebaudiana* In Stevia: The genus *Stevia*, Kinghorn A. D. (Ed), Taylor & Francis, London, p.

8). In many food processes where highly concentrated ingredients are used, a highly soluble form of Reb B will be necessary.

Rebaudioside D (CAS No: 63279-13-0), as shown in FIG. 2, is one of the sweet glycosides found in *Stevia rebaudiana*. Studies show that highly purified forms of Rebaudioside D (Reb D) possess a very desirable taste profile, almost lacking the bitterness and lingering licorice aftertaste typical for other Steviol glycosides.

These desired sensory properties of Reb D attract great interest for methods of preparation of highly purified forms of Rebaudioside D. However, highly purified steviol glycosides possess relatively low water solubility. For example Rebaudioside A (Reb A) thermodynamic equilibrium solubility at room temperature is only 0.8%. On the other hand, the water solubility of Reb B is reported to be about 0.1% and that of Reb D is even lower, only at 0.01-0.05% at room temperature (Kinghorn A. D. (2002) Constituents of *Stevia rebaudiana* In Stevia: The genus *Stevia*, Kinghorn A. D. (Ed), Taylor & Francis, London, p. 8). Reb B or Reb D can be solubilized at higher concentrations at a higher temperature, but they will quickly crystallize back from solution upon cooling to room temperature. Considering high sweetness intensity of steviol glycosides (100-300 times of sugar sweetness)—even 0.05% solubility may seem sufficient for many applications.

Many food production processes use highly concentrated ingredient mixes prior to producing final forms of food products. In that case, higher concentrations of dissolved Reb A, Reb D and Reb B will be required. It has to be noted that using the heat for dissolution of such sweeteners may not be possible in many compositions which contain heat sensitive components. Also maintaining high temperature of mixture for prolonged time to prevent premature crystallization of Rebaudioside A, B, D can cause thermal degradation of mixture components or undesirable changes of organoleptic properties.

Therefore there is a need for developing highly soluble forms or compositions of sweetener molecules which can provide stable solutions with minimal or no heat treatment. The patent applications WO/2012/109506 and WO/2013/036366 outline the methodology for making highly soluble Reb A and Reb D compositions, respectively. The invention relates to a process for producing highly soluble compositions containing purified steviol glycosides from *Stevia rebaudiana* Bertoni plant extract, more particularly the combination of Reb A, Reb D and Reb B.

In this invention, a process is developed to make a mixture of or Reb D, Reb A and Reb B with or without small amount of other steviol glycosides. The process involved precise control of pH, temperature and time to achieve blends of different ratios of Reb D, Reb A and Reb B and to make the mixer more soluble than a mechanical blend of Reb D, Reb A and Reb B.

Within the description of this invention we will show that, when applied in specific manner, certain blend of Reb D with other steviol glycosides, especially Reb A and Reb B, may impact the taste profile and offer significant advantages for stevia sweeteners' use in various food and beverage applications.

SUMMARY OF THE INVENTION

The present invention is aimed to overcome the disadvantages of existing Stevia sweeteners. The invention describes blends of selected steviol glycosides at a certain ratios for producing a high purity food ingredient from the extract of the *Stevia rebaudiana* Bertoni plant and use thereof in various food products and beverages as a sweetness and flavor modifier.

The invention, in part, pertains to an ingredient comprising steviol glycosides of *Stevia rebaudiana* Bertoni plant. The steviol glycosides are selected from the group consisting of stevioside, Rebaudioside A, Rebaudioside B, Rebaudioside C, Rebaudioside D, Rebaudioside E, Rebaudioside F, dulcoside A, steviolbioside, rubusoside, as well as other steviol glycosides found in *Stevia rebaudiana* Bertoni plant and mixtures thereof.

The invention, in part, pertains to specific blends of different steviol glycosides for producing an ingredient containing Rebaudioside D, Rebaudioside A, Rebaudioside B, stevioside, Rebaudioside C, Rebaudioside E, Rebaudioside F, dulcoside A, steviolbioside, rubusoside, as well as other steviol glycosides found in *Stevia rebaudiana* Bertoni plant and mixtures thereof.

The extraction and purification of different steviol glycosides as well as making them more soluble have been outlined in related PCT applications (PCT/US2013/051163, PCT/2012/024585, and PCT/US2011/064343). This invention, in part, pertains to combining the specific ratio of steviol glycosides in the compositions and making them of higher solubility, uniform steviol glycoside blends that contribute superior taste and sweetness profile in food and beverage applications.

This invention, in part, pertains to combining specifically Rebaudioside D, Rebaudioside A, Rebaudioside B and very small amount of other steviol glycosides (as stated above) ranging between 0.001% to 5% in the composition of the ingredient.

The invention, in part, pertains to the compositions where Rebaudioside D ranges 1% to 95%, more specifically 30% to 80% in the compositions; where Reb A ranges 5% to 50%, more specifically 10 to 40% in the compositions; where Reb B ranges 0.5% to 40%, more specifically 1% to 25% in the compositions.

The compositions can be used as sweetness enhancer, flavor enhancer and sweetener in various food and beverage products. Non-limiting examples of beverage products include carbonated and still beverages, flavored water, juice-based beverages, energy drinks and powder soft drinks. Non-limiting examples of food include dairy products (yogurt, yogurt drinks, flavored milk, frozen dairy desserts including ice cream), baked goods and baking mixes (bread, biscuits, cookies, muffins, rolls, and baking mixes), sauces and gravies, jams and jellies, gelatins, puddings and fillings, soy sauce and other soy based products, breakfast cereals, condiments and relishes, confections and frostings, processed fruits and vegetables, sugar substitutes and confectionery products including chewing gums.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention. The drawings illustrate embodiments of the invention and together with the description serve to explain the principles of the embodiments of the invention.

FIG. 7 shows the superior sweetness quality and flavor profile of the blend of Reb D, Reb A and Reb B compared to a Reb A solution.

DETAILED DESCRIPTION OF THE INVENTION

Figure 1:
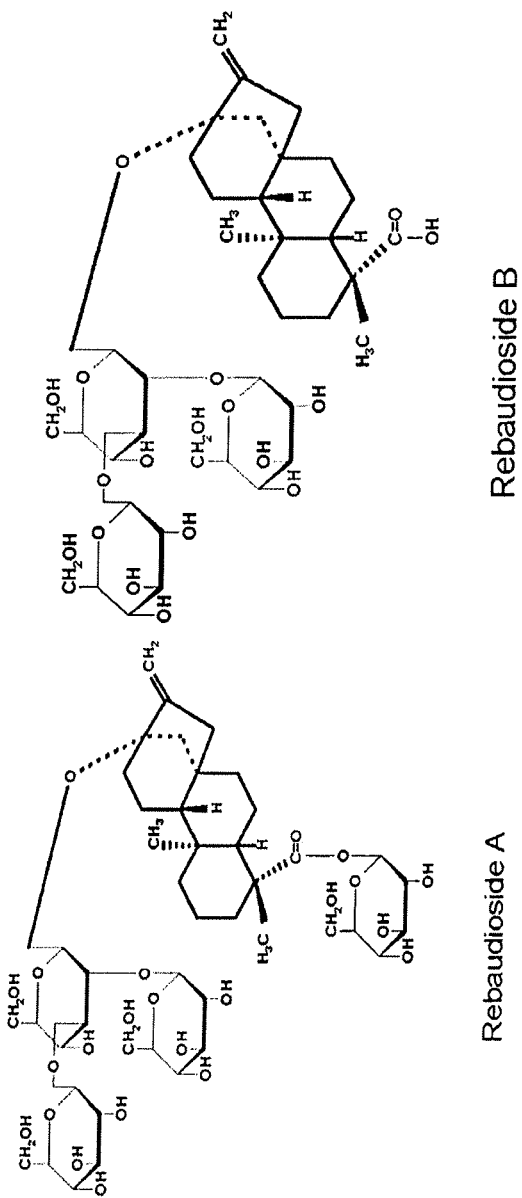
FIG. 1 shows the chemical structure of Rebaudioside A and Rebaudioside B
Figure 2:
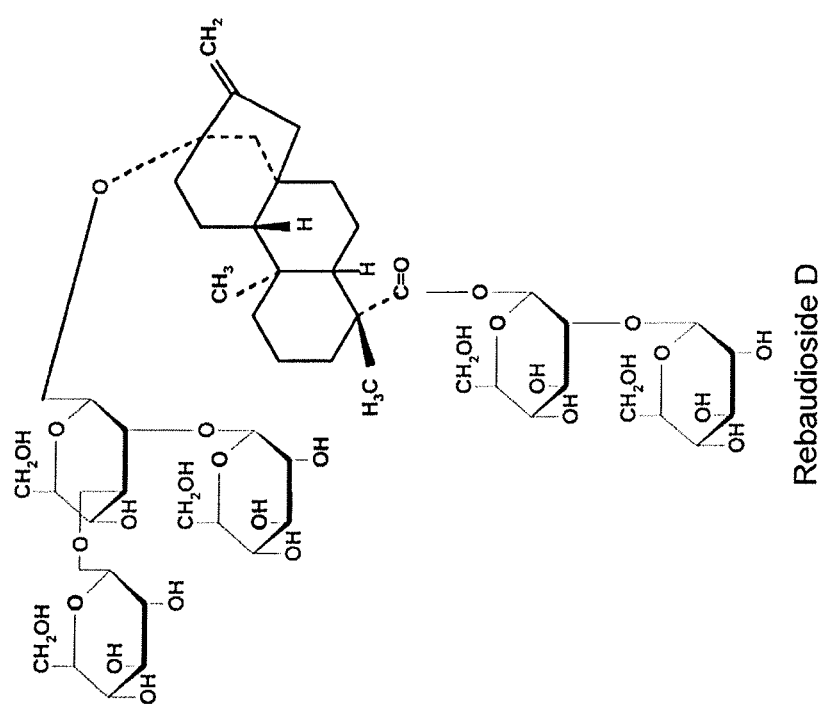
FIG. 2 shows the chemical structure of Rebaudioside D

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The compositions can be used as sweetness enhancer, flavor enhancer and sweetener in various food and beverage products. Non-limiting examples of food and beverage products include carbonated soft drinks, ready to drink beverages, energy drinks, isotonic drinks, low-calorie drinks, zero-calorie drinks, sports drinks, teas, fruit and vegetable juices, juice drinks, dairy drinks, yoghurt drinks, alcohol beverages, powdered beverages, bakery products, cookies, biscuits, baking mixes, cereals, confectioneries, candies, toffees, chewing gum, dairy products, flavored milk, yoghurts, flavored yoghurts, cultured milk, soy sauce and other soy base products, salad dressings, mayonnaise, vinegar, frozen-desserts, meat products, fish-meat products, bottled and canned foods, tabletop sweeteners, fruits and vegetables.

Additionally the compositions can be used in drug or pharmaceutical preparations and cosmetics, including but not limited to toothpaste, mouthwash, cough syrup, chewable tablets, lozenges, vitamin preparations, and the like.

The compositions can be used "as-is" or in combination with other sweeteners, flavors and food ingredients.

Non-limiting examples of sweeteners include steviol glycosides, stevioside, Rebaudioside A, Rebaudioside B, Rebaudioside C, Rebaudioside D, Rebaudioside E, Rebaudioside F, dulcoside A, steviolbioside, rubusoside, as well as other steviol glycosides found in *Stevia rebaudiana* Bertoni plant and mixtures thereof, stevia extract, Luo Han Guo extract, mogrosides, high-fructose corn syrup, corn syrup, invert sugar, fructooligosaccharides, inulin, inulooligosaccharides, coupling sugar, maltooligosaccharides, maltodextins, corn syrup solids, glucose, maltose, sucrose, lactose, aspartame, saccharin, sucralose, sugar alcohols.

Non-limiting examples of flavors include lemon, orange, fruit, banana, grape, pear, pineapple, bitter almond, cola, cinnamon, sugar, cotton candy, vanilla flavors.

Non-limiting examples of other food ingredients include flavors, acidulants, organic and amino acids, coloring agents, bulking agents, modified starches, gums, texturizers, preservatives, antioxidants, emulsifiers, stabilizers, thickeners, gelling agents.

As used herein, a "comparative" product refers to a product that has a nearly identical formulation as the test product, but without the inventive composition.

The following examples illustrate various embodiments of the invention. It will be understood that the invention is not limited to the materials, proportions, conditions and procedures set forth in the examples, which are only illustrative.

Example 1

Determination of Sweetness Profile of Steviol Glycosides

Figure 3:
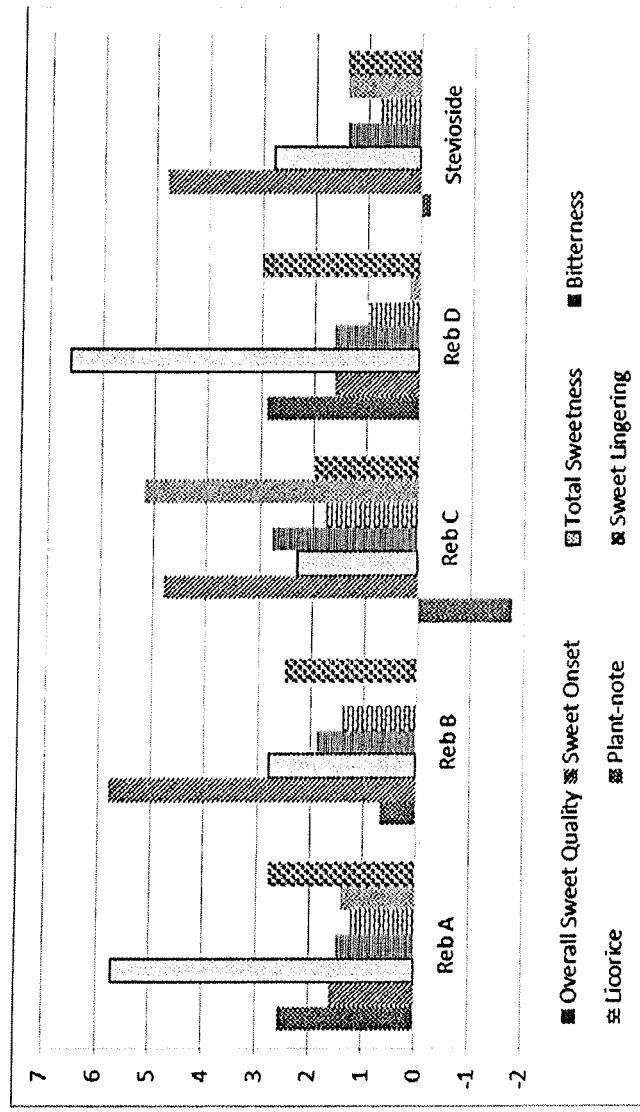
FIG. 3 shows the sweetness profile of Reb A, Reb B, Reb C, Reb D and stevioside

Stevia sweetener (Reb A, Reb B, Reb C, Reb D and stevioside) solutions were made by completely dissolving 200 ppm stevia sweeteners into distilled water. Solutions were tasted and evaluated by a trained internal panel. The taste panel estimated the sweetness intensity and associated sweetness profile including sweet onset, after tastes that include bitterness, liquorish and sweet lingering of different steviol glycosides as shown in FIG. 3. It illustrates the superior taste profile of Reb D over other steviol glycosides, specifically in the area of lower bitterness, cleaner and overall sweet taste profile.

Example 2

Preparation of Blends of Reb A, Reb B and Reb D Concentrated Solutions

The PCT application PCT/US2012/051163 illustrates the methodology to make higher soluble Reb D samples. Several concentrated suspensions of Reb D and mixtures of Reb D (RD) with Reb A (RA) and Reb B (RB) were prepared (as shown in Table 2), where sweetener to water ratio was 20:80. The Reb A, B, D samples were produced by PureCircle Sdn Bhd (Malaysia) and had 98.7%, 99.0% and 98.1% purity, respectively. The sweetener suspensions were incubated in thermostatic oil bath. The temperature was increased at 1° C. per minute to 121° C. The mixture was maintained at 121° C. for 1 hour and then the temperature was decreased to 80° C., at 1° C. per minute. A small portion of each solution was kept at 80° C. and observed for solution stability. Rest of the solution, maintained at 80° C., was then spray dried using YC-015 laboratory spray drier (Shanghai Pilotech Instrument & Equipment Co. Ltd., China) operating at 175° C. inlet and 100° C. outlet temperature. The spray dried samples were then tested for solubility at different concentrations in water. The blend sample of RD/RA/RB showed better solubility than RD or RD/RA blend as shown in Table 1.

TABLE 1

Solubility and solution stability of sweetener compositions containing Reb D

| Solutions after processing step | Observation point | RD (100) | RD/RA (70/30) | RD/RA/RB (60/35/5) |
|---|---|---|---|---|
| Solution Stability after Heat treatment | T: 1 min | Cloudy | Clear | Clear |
| | T: 5 min | Intense crystallization | Cloudy | Clear |
| | T: 15 min | Viscous Slurry | Intense crystallization | Clear |
| Solubility after Spray Drying | @ 0.05% | Slightly Cloudy | Clear | Clear |
| | @ 0.5% | Cloudy | Slightly Cloudy | Clear |
| | @ 1.0% | Visible Precipitation | Cloudy | Clear |

Example 3

Sweetness Potency of Reb A, Reb B, Reb D and Their Blend

Figures 4, 5:
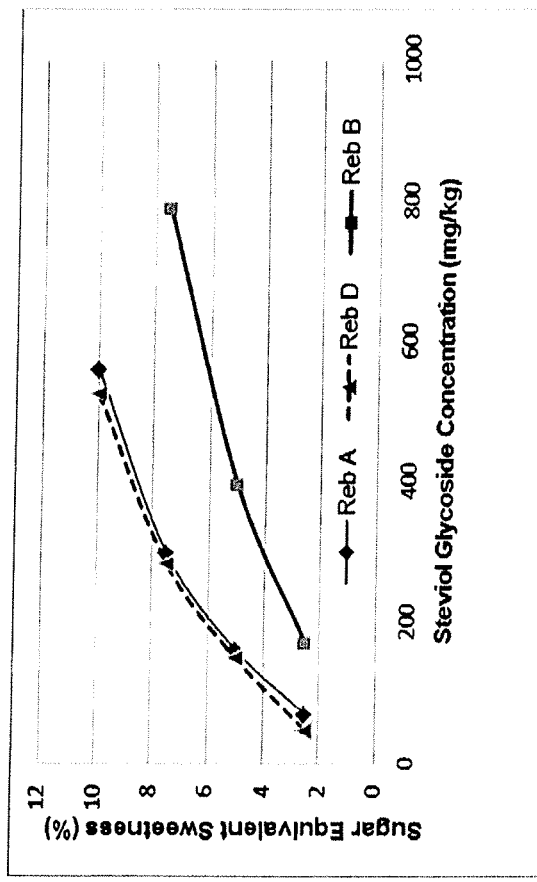
FIG. 4 shows the iso-sweet levels of Reb A, Reb B and Reb D
FIG. 5 shows the sweetness potency of Reb A, Reb B, Reb D and one of their blends called Delta

Several sweetener solutions of sugar, Reb A, Reb B and Reb D samples were made by completely dissolving different amount of sweeteners into distilled water. Solutions were tasted and evaluated by a trained internal panel to develop iso-sweet curves for each sweetener against sugar solutions as shown in FIG. 4. Similar iso-sweet data was generated for a blend (called Delta) of Reb A, Reb B and Reb D prepared by the methodology outlined in Example 2. The sweetness potency values (FIG. 5) were calculated at each sugar-equivalent sweetness level for individual and a blend (Delta) of Reb D, Reb A and Reb B sweeteners.

Example 4

Sweetener solutions were made with 300 ppm of different combination of Reb A, Reb B, Reb D in distilled water. A trained panel of five employees tasted these samples in duplicates and commented the quality of sweetness profile as shown in Table 2. The tri-blend of sweeteners gave better sweetness profile than di-blend of sweetener.

TABLE 2

Blend of stevia sweetener and their effect on sweetness profile

| Sample | Ratio of Sweetener | Comment |
|---|---|---|
| Reb D/Reb B | 75/25 | Fast sweet peak, mouthcoating, lingering |
| Reb D/Reb A | 65/35 | Mouth coating, sweetness builds, some lingering |
| Reb A/Reb D/Reb B | 50/30/20 | More rounded sweetness, slight lingering, less sweet than other two sample |

Example 5

Comparison of Sweetness Profile of Blends of Reb A, Reb B and Reb D

Prepared 10% sugar-equivalent sweetness solutions in acidified water (citric acid 700 ppm) with 500 ppm Reb A (99.3% purity), 1512 ppm Reb B (99.1% purity) and 488 ppm Reb D (98.2% purity). Used the individual sweetener solutions to create two blended solutions with sweetness ratios of Reb A:Reb B:Reb D as 1:1:1, and 1:1:2. Also, prepared a 10% sugar-equivalent sweetness acidified solution (citric acid 700 ppm) with 526 ppm PureCircle Alpha (PureCircle Limited) that contains Reb A and Reb B in an approximate ratio of 4:1.

A semi-trained panel of 12 members tasted the samples presented in a randomized format. Difference testing was performed to evaluate sweetness onset, total sweetness, rounded sweetness, bitterness, acidity, plant note, licorice, astringency, mouth coating, sweet lingering, and bitter lingering. Samples were rated on scale of zero (0) to ten (10), with zero indicating immediate onset, no intensity or very sharp peak, and ten indicating very late onset, high intensity, or very round peak. Sucrose solutions of 5% and 10% in acidified water (700 ppm citric acid) were presented to panelists as references for 5 and 10 points on the sweetness scale, respectively. One-way single factor ANOVA was used to analyze sensory results. Average scores were computed and used for comparison as shown in FIG. 6.

Figure 6:
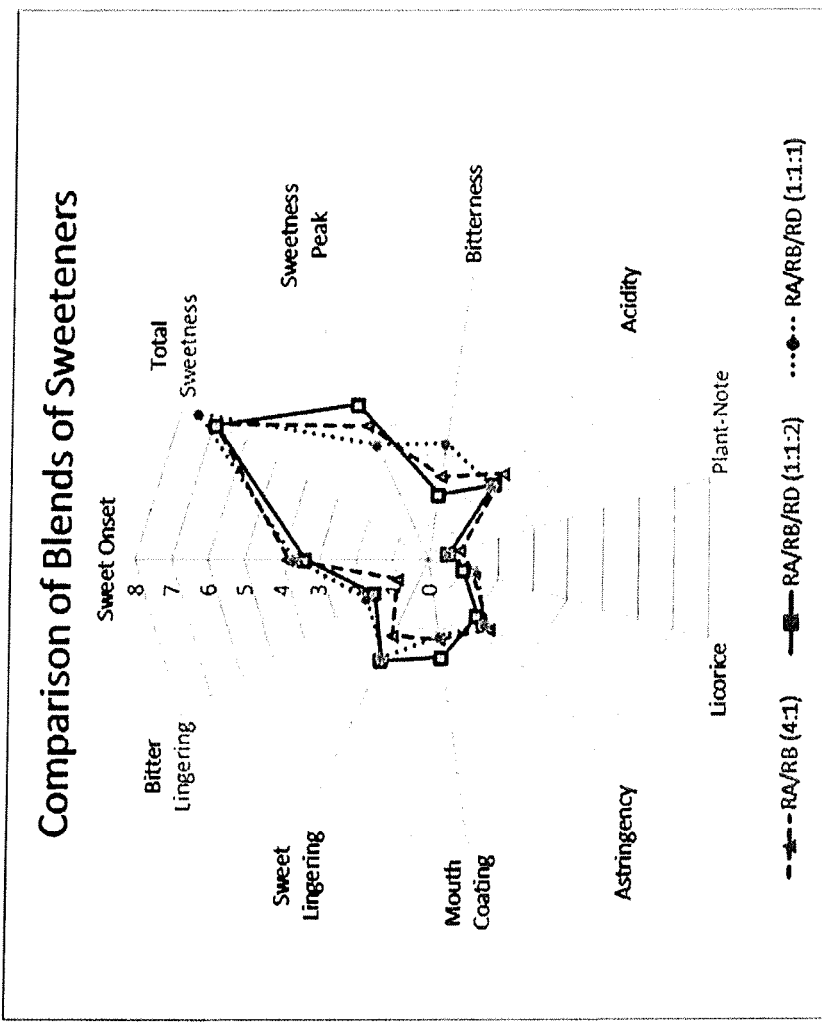
FIG. 6 shows the effect of blends of Reb D, Reb A and Reb B in different proportions in acidic water system

FIG. 6 show that Reb D, in a blend with Reb A and Reb B, decreases bitterness and modifies the sweetness profile.

Example 6

Comparison of Sweetness Profile of Reb A and Delta in Acidic Solution

Two sweetener solutions of Reb A and Delta (a blend of Reb D, Reb A and Reb B) were prepared in a citric acid solution at pH 3.2. The concentrations of Reb A and Delta were 550 and 926 ppm, respectively. Both samples were tested in duplicated by a trained sensory panel of 10 members, who evaluated sweetness profile and several attributes as shown in FIG. 7. Delta provided rounded sweetness and flavor profile, significantly less bitter, less astringency and tingle/burn sensation, and less lingering compared to Reb A.

Example 7

Reduced Sugar Peach Flavored Ice Tea Samples with Reb A and Delta

The peach flavored ice tea samples as outlined in Table 3 was prepared using different sweetener, where the control was made with 7.7% sugar, the test samples were made with 50% less sugar and stevia sweeteners PureCircle Reb A 97 or PureCircle Delta, which is a blend of Reb D, Reb A and Reb B. The ice tea samples were tested by an internal trained panel of tasters. The panel concluded that Delta provided a cleaner and rounded sweetness profile compared to Reb A. The Delta sample had similar sweetness profile of the control (sugar sweetened). Majority of the panel members detected difference in mouthfeel, expressed as syrupy, between reduced sugar samples and control.

TABLE 3

Peach flavored ice tea samples prepared with different sweeteners

|  | Control | Reb A 97 | Delta |
|---|---|---|---|
| Water | 91.9 | 95.7 | 95.7 |
| Sucrose | 7.70 | 3.85 | 3.85 |
| Black Tea Powder - Finlays STD90 | 0.138 | 0.138 | 0.138 |
| Black Tea Powder - Finlays STD625 | 0.138 | 0.138 | 0.138 |
| Citric Acid | 0.088 | 0.088 | 0.088 |
| Peach Flavor - OC Flavors | 0.033 | 0.033 | 0.033 |
| Sodium Citrate | 0.015 | 0.015 | 0.015 |
| Potassium Sorbate | 0.015 | 0.015 | 0.015 |
| PureCircle Reb A 97 |  | 0.0139 |  |
| PureCircle Delta |  |  | 0.0149 |
| Xanthan Gum - TIC | 0.0013 | 0.0013 | 0.0013 |

Example 8

No-Sugar Added Carbonated Cola Drink

Carbonated cola drink samples were prepared using Reb A or Delta as the only sweetener. Two different Reb A samples were used, one of which had 99.3% purity (Reb A 99), the other had 97.5% purity (Reb A 97). The regular and diet Cola syrup were prepared with ingredients as outlined in Table 4. The diet syrup was sweetened with stevia sweetener and diluted with carbonated water (ratio to make the beverage. The concentration of Reb A used for both purity levels was 530 ppm, whereas the Delta content was 926 ppm in the final product.

TABLE 4

Cola Beverage Syrup

| COLA BEVERAGE FORMULA | Control | Diet |
|---|---|---|
| Water | 84.9415 | 99.5817 |
| HFCS 55 | 14.6402 | |
| Cola Flavor - Flavor Systems International | 0.3750 | 0.3750 |
| Phosphoric Acid 85% | 0.0333 | 0.0333 |
| Caffeine | 0.0100 | 0.0100 |
| Total | 100 | 100 |

A 5-members trained panel evaluated the samples in duplicate by using standard references for three attributes—sweetness, brown spice and vanilla flavor notes. Delta showed significantly higher sweetness and directionally higher spice note compared to Reb A. There was no difference in vanilla note. The overall taste of the formula with Delta was preferred.

Example 9

No Fat Yogurt

The objective of this test was to determine the effect of individual stevia sweeteners, different blends of those sweeteners and flavor modifiers on the organoleptic quality of no-fat, no-sugar added yogurt. The Dannon non-fat, plain yogurt (DANONE) was used for making yogurt with different sweeteners including sugar and stevia sweeteners—Reb A, Reb D, Reb B and their blends as outlined in Table 5. Samples included a full sugar reference and 6 samples with stevia sweeteners and their blends. Test 5 and 6 samples were zero sugar samples, which contained RebA/RebB/Reb D blend. Test 6 sample had stevia sweetener blend and flavor modifiers—NSF01 (PureCircle), Taumatin (Naturex), and GSG (an isolated fraction of NSF02, a flavor modifier marketed by PureCircle).

TABLE 5

No-fat yogurt samples sweetened with sugar and stevia sweeteners

| | Control | Test 1 | Test 2* | Test 3 | Test 4 | Test 5 | Test 6 |
|---|---|---|---|---|---|---|---|
| No-Fat Yogurt | 92.0 | 98.96 | 98.96 | 98.96 | 98.96 | 99.96 | 99.96 |
| Sugar | 8.00 | 1.0 | 1.0 | 1.0 | 1.0 | 0 | 0 |
| Reb A | | 0.04 | 0.032 | | | 0.012 | 0.004 |
| Reb B | | | 0.008 | | 0.008 | 0.001 | 0.001 |
| Reb D | | | | 0.04 | 0.04 | 0.02 | 0.008 |
| NSF01 (PureCircle) | | | | | | | 0.017 |
| GSG (Reb Q/R) (PureCircle) | | | | | | | 0.0084 |
| Taumatin (Naturex) | | | | | | | 0.0001 |

*Test 2 contained PureCircle Alpha

The yogurt samples were prepared by adding sweetener(s) in powder form to the non-fat yogurt mixed thoroughly and then refrigerated overnight. All samples were evaluated by a trained internal panel and screened for overall sweetness, bitterness, astringency, mouth coating, flavor intensity, acidity/tartness, sweet lingering and bitter lingering.

The Test 1 sample with Reb A 97 had significant bitter taste, which was improved in the Test 2 (with Reb A and Reb B), but test 2 showed significant lingering. The Test 3 sample with Reb D tasted better than Test 1 and 2 with significantly less lingering compared to Test 2. The Test 4 sample with Reb D and Reb B blend showed slightly delayed, but higher sweetness than control and slight mouth coating with astringency. The Test 5 had slightly lower sweetness due to significantly lower amount of Reb D, which impacted the overall sourness and sweetness lingering. The panel judged the Test 6 as the best among all samples where stevia derived flavors (NSF01, Reb Q/R) and taumatin helped in rounding the sweetness profile with no lingering, as well as balanced the acidity profile with very little astringency.

Although the foregoing description and examples have fully described the present invention, it should be understood that various changes, substitutions and alterations can be made herein without departing from the spirit and scope of the invention. The scope of the application is not intended to be limited to the particular embodiments of the invention described in the specification. As one skilled in the art will readily appreciate from the disclosure of the invention, the compositions, processes method and steps, presently existing or later to be developed that perform substantially the same function or achieve substantially the same result as the corresponding embodiments described herein are encompassed by the scope of the invention.

We claim:

1. A high solubility *Stevia* sweetener composition made by a process consisting essentially of the steps of:
   a) providing Reb D as a first *Stevia* sweetener;
   b) providing a second *Stevia* sweetener that is comprised of Reb A and Reb B of different ratios;
   c) providing water;
   d) mixing the water and the first and second *Stevia* sweeteners to make a mixture;
   e) increasing the temperature of the mixture by a gradient heat treatment having a controlled rate of temperature change of 1° C./minute to an elevated temperature of about 118° C. to about 125° C. to make a solution;
   f) holding the solution at the elevated temperature;
   g) decreasing the temperature of the solution by a gradient cooling method having a controlled rate of temperature change of 1° C./minute to obtain a *Stevia* sweetener solution having a clear solution stability at 80° C. for up to 15 minutes at a total sweetener concentration of up to 20% by weight; and
   h) spray drying the *Stevia* sweetener solution,
   wherein the the high solubility *Stevia* sweetener composition has a Reb D:Reb A:Reb B ratio of about 60:35:5 and a clear solubility at a sweetener concentration of up to 1% by weight.

2. The high solubility *Stevia* sweetener composition of claim 1, wherein the Reb B is at least partially converted to a carboxylate salt.

3. A reduced sugar or no-sugar added carbonated soft drink beverage comprising the high solubility *Stevia* sweetener composition of claim 1, having higher sweetness, rounded flavor perception and overall preference compared to Reb D, Reb A or Reb B sweeteners used individually as a sole sweetener or as a di-blend of these sweeteners in a comparative beverage.

4. The beverage of claim 3, wherein the reduced sugar or no-sugar soft drink beverage further comprises cola flavor, and the higher sweetness, round flavor perception and overall preference are compared to a Reb A sweetened cola beverage.

5. A reduced sugar or no-sugar added iced tea beverage comprising the high solubility *Stevia* sweetener composition of claim 1, having a rounded sweetness with a more sugar-like sweetness profile compared to a Reb A sweetened reduced sugar or no-sugar added iced tea.

6. A reduced sugar or no-sugar added dairy product comprising the high solubility *Stevia* sweetener composition of claim 1, having a rounded sweetness with reduced bitterness compared to a Reb A, or Reb B or Reb D sweetened dairy products.

7. The dairy product of claim 6, wherein the high solubility *Stevia* sweetener composition further comprises flavor modifiers and additional sweeteners selected from the group consisting of mogrosides, monatin, and thaumatin, wherein the dairy product comprising the high solubility *Stevia* sweetener composition has a most preferred sweetness with reduced bitterness compared to dairy products sweetened with di-blends of Reb A, or Reb B or Reb D.

8. Food or beverage products comprising the high solubility *Stevia* sweetener composition of claim 1, wherein the sweetener is used as sweetener, a sweetness and flavor profile enhancer, or a flavor modifier, and the food or beverage products are selected from the group consisting of: carbonated soft drinks, ready to drink beverages, energy drinks, isotonic drinks, low-calorie drinks, zero-calorie drinks, sports drinks, teas, fruit and vegetable juices, juice drinks, dairy drinks, yoghurt drinks, alcohol beverages, powdered beverages, bakery products, cookies, biscuits, baking mixes, cereals, confectioneries, candies, toffees, chewing gum, dairy products, flavored milk, yoghurts, flavored yoghurts, cultured milk, soy sauce and other soy base products, salad dressings, mayonnaise, vinegar, frozen-desserts, meat products, fish-meat products, bottled and canned foods, tabletop sweeteners, fruits, and vegetables.

* * * * *